US012350912B2

(12) United States Patent
Bae (10) Patent No.: US 12,350,912 B2
(45) Date of Patent: Jul. 8, 2025

(54) FLOORING MATERIAL USING POZZOLAN AND MANUFACTURING METHOD THEREOF

(71) Applicant: PUNGHAN INDUSTRY CO., LTD., Seoul (KR)

(72) Inventor: Ho Joon Bae, Seoul (KR)

(73) Assignee: PUNGHAN INDUSTRY CO., LTD., Seoul (KR)

( * ) Notice: Subject to any disclaimer, the term of this patent is extended or adjusted under 35 U.S.C. 154(b) by 417 days.

(21) Appl. No.: 17/992,804

(22) Filed: Nov. 22, 2022

(65) Prior Publication Data

US 2023/0330965 A1    Oct. 19, 2023

(30) Foreign Application Priority Data

Apr. 14, 2022  (KR) .................. 10-2022-0046328

(51) Int. Cl.
*B32B 3/06*      (2006.01)
*B32B 9/00*      (2006.01)
(Continued)

(52) U.S. Cl.
CPC ................ *B32B 3/06* (2013.01); *B32B 9/002* (2013.01); *B32B 27/08* (2013.01); *B32B 27/304* (2013.01);
(Continued)

(58) Field of Classification Search
CPC ........... B32B 3/06; B32B 9/002; B32B 27/08; B32B 27/304; B32B 27/32; B32B 37/06; B32B 37/10; B32B 27/18; B32B 27/40; B32B 2255/10; B32B 2264/1021; B32B 2270/00; B32B 2305/30; B32B 2307/102; B32B 2307/402; B32B 2307/554; B32B 2307/558; B32B 2307/71; B32B 2318/04; B32B 2323/04; B32B 2327/06; B32B 2375/00; B32B 38/145; B32B 37/08; B32B 2307/4023; B32B 2307/714;
(Continued)

(56) References Cited

U.S. PATENT DOCUMENTS

2020/0325689 A1    10/2020   Li
2021/0087835 A1     3/2021   Li
(Continued)

FOREIGN PATENT DOCUMENTS

JP            3868245 B2 *  1/2007
JP         2022-511014 A    1/2022
(Continued)

OTHER PUBLICATIONS ip.com translation of KR101349144B1 (Year: 2025).*
ip.com translation of JP3868245B2 (Year: 2025).*

*Primary Examiner* — Michael Zhang
(74) *Attorney, Agent, or Firm* — IP Legal Services, LLC (57) ABSTRACT

The present invention relates to a flooring material including: a base material layer as a stone plastic composite (SPC) core; a color film layer formed on top of the base material layer to provide a given color and pattern; a wear layer formed on top of the color film layer to provide a corrosion resistance; a UV resistant layer formed on top of the wear layer to provide surface protection; and a pad layer formed on the underside of the base material layer to provide shock absorption and sound absorption.

5 Claims, 8 Drawing Sheets

(51) Int. Cl.
- B32B 27/08 (2006.01)
- B32B 27/18 (2006.01)
- B32B 27/30 (2006.01)
- B32B 27/32 (2006.01)
- B32B 27/40 (2006.01)
- B32B 37/06 (2006.01)
- B32B 37/10 (2006.01)
- E04F 15/02 (2006.01)
- E04F 15/10 (2006.01)

(52) U.S. Cl.
CPC .............. *B32B 27/32* (2013.01); *B32B 37/06* (2013.01); *B32B 37/10* (2013.01); *E04F 15/02038* (2013.01); *E04F 15/107* (2013.01); *B32B 27/18* (2013.01); *B32B 27/40* (2013.01); *B32B 2255/10* (2013.01); *B32B 2264/1021* (2020.08); *B32B 2270/00* (2013.01); *B32B 2305/30* (2013.01); *B32B 2307/102* (2013.01); *B32B 2307/402* (2013.01); *B32B 2307/554* (2013.01); *B32B 2307/558* (2013.01); *B32B 2307/71* (2013.01); *B32B 2318/04* (2013.01); *B32B 2323/04* (2013.01); *B32B 2327/06* (2013.01); *B32B 2375/00* (2013.01); *E04F 2201/0161* (2013.01); *E04F 2201/023* (2013.01); *E04F 2201/042* (2013.01); *E04F 2201/043* (2013.01)

(58) Field of Classification Search
CPC ............ B32B 2250/24; B32B 2250/05; B32B 2307/56; B32B 2471/00; B32B 27/06; B32B 33/00; B32B 38/0004; B32B 2307/3065; B32B 2307/552; B32B 2307/7265; B32B 2419/00; E04F 15/02038; E04F 15/107; E04F 2201/0161; E04F 2201/023; E04F 2201/042; E04F 2201/043; E04F 15/102; E04F 15/02; E04F 15/18; E04F 15/181; E04F 15/20; E04F 2201/03; E04F 2290/04; E04F 2290/041; E04F 2290/045
See application file for complete search history.

(56) References Cited

U.S. PATENT DOCUMENTS

| | | |
|---|---|---|
| 2022/0001572 A1 | 1/2022 | Clement et al. |
| 2022/0056703 A1 | 2/2022 | Boucke |
| 2022/0243483 A1 | 8/2022 | Clement et al. |

FOREIGN PATENT DOCUMENTS

| | | |
|---|---|---|
| KR | 10-1349144 B1 | 1/2014 |
| KR | 10-1441345 B1 | 9/2014 |
| KR | 10-1608692 B1 | 4/2016 |
| KR | 10-2146644 B1 | 8/2020 |
| KR | 10-2021-0155389 A | 12/2021 |
| KR | 10-2022-0033501 A | 3/2022 |

* cited by examiner

Fiti  FITI Testing & Research Institute
(28115) 21 3-kil Yangcheong, Ochang-eup, Chungwon-gu
Chungju-si Chungbuk Tel:043-711-8875 Fax: 043-711-8804

| Inspection Results |  |
|---|---|
| Safety standard part 67 of Safety conformity living products [Korean Agency for Technology and Standards No.2020-146(July 24, 2020)] Indoor flooring material |  |
| Issue No. M254-21-01089 Inspector: KIM Daejin Approver: LEE Dohyung Issue Date: November 16, 2021 | Page No. 1/4 |
| Inspection Institute Name: FITI testing & research institute Address:21 3-kil Yangcheong, Ochang-eup, Chungwon-gu, Chungju-si Chungbuk | FITI testing & research institute (Seal) |
| Manufacturer: Changzhou Punghan Deco Limited Company Address: 82 bun-gil, waypu-ro, hungrin-eup, economic development restrict, Changzhou-si Applicant : Punghan Industry Co., Ltd. (Importer) Address: Fourth floor, 11 Opansan-ro, Sungdong-gu, Seoul |  |
| Inspection standard: Safety standard part 67 of Safety conformity living products [Korean Agency for Technology and Standards No.2020-146(July 24, 2020)] Inspection procedure: Safety conformity of electrical appliances and living products according to safety management act Application standard excepting safety standard: - |  |
| Inspection object: Indoor flooring material Safety authorization No. or report No.: - Model/Form: MTW POZZOLANA-1001 Regular/safety standard model division: PVC flooring material, vinyl flooring tile, mixed (half-hard), non-Ondol |  |
| Inspection results: Adequate Attached documents 1. Inspection result contents 2. Range of derived model and product remarks (none) 3. Safety management parts and insulation material list (none) 4. Product Photo 5. Display items and precaution or warning phases |  |
| Contract code for inspection determination In the case where inspection is not applied: N/A (Not Applicable) In the case of inspection standard is satisfied: P(Pass) In the case of inspection standard is not satisfied: F(Fail) |  |
| Inspection duration Sample reception date: October 12, 2021 Inspection execution duration: October 12, 2021 to November 16, 2021 |  |
| General requirement This inspection certificate cannot be changed and corrected without the approval of certificate authority. The results of the inspection certificate are effective in the corresponding inspected model. |  |
| Others This certificate represents inspection results for the field authorized from KOLAS |  |
| **\* Document checking No. LQEL-47M2-F41R \*** It is checked whether the above results are changed in "certification checking" menu after accessed to homepage |  | e-DOCUMENT SERVICE----------FITI-IQP-011-15(Rev.4)

FIG. 4

Fiti

FITI Testing & Research Institute

(28115) 21 3-kil Yangcheong, Ochang-eup, Chungwon-gu
Chungju-si Chungbok Tel: 043-711-2875 Fax: 043-711-8804

Issue No. 8254-21-01089
Page No. 2/4

| Inspection Item | | Unit | Standard Value | Result | Pass/Failure |
|---|---|---|---|---|---|
| Outer appearance | | - | No cracked, broken, bent, and hole portions have to exist | No cracked, broken, bent, and hole portions | P |
| | | - | No remarkable abnormal concaved/convexed, shape, glossy, non-uniform color contamination, grooves, foreign matter mixing have to exist | No remarkable abnormal concaved/convexed, shape, glossy, non-uniform color contamination, grooves, foreign matter mixing | P |
| Surface coating thickness* | Minimal | um | 8 um or more | Impossible to measure (None-coating layer) | N/A |
| | Mean | um | 15 um or more | Impossible to measure (None-coating layer) | N/A |
| * In the case of a product having an amount of phthalate plasticizer of 0.1% or less of a non-Ondol flooring material and the whole product, surface coating layer may be omitted. | | | | | |
| Tensile strength (vinyl flooring) | | N/cm² | N/A | N/A | N/A |
| | | | N/A | N/A | N/A |
| Tearing strength (vinyl flooring) | | N/cm | N/A | N/A | N/A |
| | | | N/A | N/A | N/A |
| Extrusion quantity | 20°C | mm | 0.15 mm or more | 0.18 | P |
| | 20°C | mm | 0.8 mm or less | 0.21 | P |
| Remaining extrusion rate | | % | 0.20 % or less | 0.28 | P |
| Length change rate by heating | | % | 0.20 % or less | Horizontal 0.01 | P |
| | | | | Vertical 0.02 | P |
| Length change rate by absorption | | % | 0.20 % or less | Horizontal 0.02 | P |
| | | | | Vertical 0.01 | P |
| Weight reduction rate by Heating | | % | 0.5 % or less | 0.01 | P |
| Scratch test (vinyl flooring tile) | 95% of ethanol | mm | width of groove has to be less than 3.1 mm | 1.52 | P |
| | 2% of sodium hydroxide solution | | | 1.52 | P |
| | Soybean oil | | | 1.50 | P |
| | Kerosene | | | 1.52 | P |
| Contamination | | - | No remarkable color and gloss changes and lifting have to exist | No remarkable color and gloss changes and lifting | P | e-DOCUMENT SERVICE--------------------------------------------------------FITI-IQP-011-15(Rev.4)

FIG. 5

Fiti   FITI Testing & Research Institute (28115) 21 3-kil Yangcheong, Ochang-eup, Chungwon-gu
Cheongju-si Chungbuk Tel:043-711-8875 Fax: 043-711-8804

Issue No. N251-21-01089
Page No. 3/4

| Inspection item | | | Unit | Standard Value | Results | Pass/Failure |
|---|---|---|---|---|---|---|
| Total amount of Phthalate plasticizer contained | Upper layer | DEHP | % | 3.0% or under | 0.01 or less | P |
| | | DBP | | | 0.01 or less | |
| | | BBP | | | 0.01 or less | |
| | | Total | | | 0.01 or less | |
| | Lower layer | DEHP | % | 10.0% or under | 0.01 or less | P |
| | | DBP | | | 0.01 or less | |
| | | BBP | | | 0.01 or less | |
| | | Total | | | 0.01 or less | |
| | Whole product | DEHP | % | – | 0.01 or less | N/A |
| | | DBP | | | 0.01 or less | |
| | | BBP | | | 0.01 or less | |
| | | Total | | | 0.01 or less | |
| -Detection limit: -DEHP(Diethylhexyl Phthalate) -DBP (Dibutyl Phthalate) -BBP (Butyl benzyl Phthalate) | | | | | | |

\*\* Inspection result recording is ended\*\*

FITI-IQP-011-15(Rev.4)

FIG. 6

Fiti  FITI Testing & Research Institute (28115) 21 3-gil Yangcheong, Ochang-eup, Cheongwon-gu
Cheongju-si Chungbuk Tel: 043-711-8875 fax: 043-711-8894

Issue No. 3254-21-01089
Page No. 4/4

-Indications according to electrical appliances and living products safety management act-

Safety standard part 67 of Safety conformity living products (Indoor flooring material No. 1 7. Indications

| |
|---|
| The following indications have to be suggested per minimal unit packing of a product. Further, KC mark, purpose, model name, manufacturing year and data (or lot number), and manufacturer name (or importer name) have to be indicated to be not erasable every range within 1 mm (if a length of the product is 1 m or under, one time indication) on the back of the product by means of printing. However, vinyl flooring tiles may not have any indications on the backs of the products. |
| 7.1. Purpose (Ondol/Non-Ondol)<br>*In the case of Ondol product, a phrase "usable with non-ondol product" is added<br>7.2 Model Name (Abbreviation is possible if indicated on the back of the product)<br>7.3 Dimension (Thickness, Width, Length)<br>7.4 Manufacturing year and date or lot No.<br>7.5 Manufacturer Name (Abbreviation is possible if indicated on the back of the product)<br>7.6 Importer Name (Only in the case of imported products, abbreviation is possible if indicated on the back of the product)<br>7.7 Address or Telephone No. (Domestic manufacturer in the case of domestic product and Importer in the case of imported product<br>7.8 Manufacturing country (Imported product is indicated according to foreign trade act<br>7.9 Precautions for use |

-Product Photoe-DOCUMENT SERVICE------------------------------------------------------FITI-IQP-011-15(Rev.4)

This certificate is the inspection result for the sample suggested and does not guarantee the quality of the entire product, and the name of the sample is suggested by a client.

This certificate cannot be used for promotion, advertising, and lawsuit without pre-written consent of FITI, and is not allowed to be used for other purposes excepting the inherent purpose.

FIG. 7

KcL

Inspection Certificate

1. Certification No.: CT21-102825K
2. Client
   O Company Name : Punghan Industry Co., Ltd.
   O Address: Fourth floor, 11 Opansan-ro, Sungdong-gu, Seoul
3. Inspection duration: September 27, 2021 to November 9, 2021
4. Purpose of Inspection Certificate: Submission of Environmental Mark Certificate
5. Sample Name: SPC pozzolan flooring material
6. Inspection method
  (1) KS M 1998:2017
7. Inspection result
1) SPC pozzolan flooring material

| Inspection item | Unit | Inspection method | Inspection Result | Remark | Inspection place |
|---|---|---|---|---|---|
| Amount of formaldehyde emitted-Mean value | mg/L | (1) | Not detected (detection limit of 0.05) | -- | A |

\* Inspection Place
A: 85 Dambang-ro Namdong-gu, Incheon-si

| Check | Writer Name IM Jongwhi | Technical Manager Name KANG Munsik |
|---|---|---|
| Remark 1. This certificate has no relation with KS Q ISO/IEC 17025 and KOLAS agreement, is the result limited to the sample and sample name suggested by the client, and does not guarantee the quality of the entire product. 2. This certificate cannot be used for promotion, advertising, and lawsuit without pre-written consent of FITI, and is not allowed to be used for other purposes excepting the inherent purpose. 3. The result used by extracting some of this certificate cannot be guaranteed. 4. The authenticity of this certificate is checkable in homepage www.kcl.re.kr | | |

November 9, 2021

Korean Conformity Laboratory Chief

FIG. 8

```
KIFA              Korea Far Infrared Association
          Korea Institute of Far Infrared Applied Estimation Inspection Certificate
Issue No.: KFI-156
Client: BAE Hojun [Punghan Industry Co., Ltd.]
Address: Fourth floor, 11 Opansan-ro, Sungdong-gu, Seoul
Date of Receipt: January 26, 2022
```

Inspection Results

| Emissivity (5 ~ 20 um) | Emission energy (W/m²· um, 40° C) |
|---|---|
| 0.905 | 3.64 10² |

1) Inspection method: KFIA-FI-1005
2) This inspection was performed at 40C according to the request of the client and suggested the measured results with respect to BLACK BODY, using FT-IR spectrometer
3) Attached: Appendix
4) Purpose: Quality management Feb. 4, 2022

\* 1. This certificate is the result for the sample provided by the client, and the name of the sample is suggested by the client.
  2. This certificate is not allowed to be used for other purposes excepting the inherent purpose.

Manager: KIM Jaeki 02)2203-6084

Korea Institute of Far Infrared Applied Estimation Chief

FIG. 9

*KcL* Inspection Certificate

1. Certification No.: CT21-102824K

2. Client

O Company Name: Punghan Industry Co., Ltd.

O Address: Fourth floor, 11 Opansan-ro, Sungdong-gu, Seoul

3. Inspection duration: September 27, 2021 to January 19, 2022

4. Purpose of Inspection Certificate: Submission of Environmental Mark Certificate 5. Sample Name: SPC pozzolan flooring material 6. Inspection method (1) Suggested by client (See remarks)

7. Inspection result

1) SPC pozzolan flooring material

| Inspection item | Unit | Inspection method | Inspection Result | Remark | Inspection place |
|---|---|---|---|---|---|
| Concentration of radon(Rn-222) in chamber (Maximum value) | Bq/M$^3$ | (1) | 18.1 | (25.0±2.0)°C Dehumidification Condition (10% R.H. or under) | A |
| Concentration of radon(Rn-222) in chamber (Maximum value on Day 7) | Bq/M$^3$ | (1) | 7.3 | | |
| Amount of radon(Rn-222) emitted per unit mass | Bq/(kg· h) | (1) | 0.002 | | |
| Amount of radon(Rn-222) emitted per unit area | Bq/(kg· h) | (1) | 0.011 | | |

Remark) Inspection method suggested by the client: A study on management of non-regulated indoor air pollutant (II) Study report pp 11-17 (National Institute of Environmental Research, 2010)

-Measurement Equipment: RAD7 (Durridge Co., S/N 5028)

-Measurement Time: 168 h, the result of emission amount is calculated with a mean value of day 7 (145h-168h).

-Sample information: (160 mm x 160 mm x 10 mm, two sheets)

* Inspection Place

A: 806 Gunpo Hyundai I-valley. 149 Gongdan-ro, Gunpo-si, Gyeonggi-do

| Check | Writer Name LEE Yeonsung | Technical Manager Name LEE Jungyu |
|---|---|---|
| Remark 1. This certificate has no relation with KS Q ISO/IEC 17025 and KOLAS agreement, is the result limited to the sample and sample name suggested by the client, and does not guarantee the quality of the entire product. 2. This certificate cannot be used for promotion, advertising, and lawsuit without pre-written consent of FITI, and is not allowed to be used for other purposes excepting the inherent purpose. 3. The result used by extracting some of this certificate cannot be guaranteed. 4. The authenticity of this certificate is checkable in homepage www.kcl.re.kr |||

January 19, 2022

Korean Conformity Laboratory Chief

FLOORING MATERIAL USING POZZOLAN AND MANUFACTURING METHOD THEREOF

CROSS REFERENCE TO RELATED APPLICATION OF THE INVENTION

The present application claims the benefit of Korean Patent Application No. 10-2022-0046328 filed in the Korean Intellectual Property Office on Apr. 14, 2022, the entire contents of which are incorporated herein by reference.

BACKGROUND OF THE INVENTION

Field of the Invention

The present invention relates to a flooring material using pozzolan and a manufacturing method thereof, and more specifically, to a flooring material using pozzolan and a manufacturing method thereof that are capable of making use of a Stone Plastic composite (SPC) including the pozzolan so that the flooring material does not generate any harmful substances, has rare contraction and expansion to provide high durability, is possible to be cleaned with steam to allow its care to be easy, and especially installed on places such as kitchens, living rooms, and other places where eco-friendly construction is needed to provide impact resistance, flame retardancy, waterproofing, and sound absorption.

Background of the Related Art

Generally, a flooring material is made of a sheet of wood, and with the development in the cultures of houses, especially apartments, eco-friendly flooring materials for blocking moisture from a concrete floor and harmful substances have appeared.

Wooden flooring materials are used as mostly popular flooring materials.

However, the wooden flooring materials may cause scratches, cracks, and the like when physical impacts are applied thereto, and they may be hard to be returned to their original shape if they are deformed in shape because of water permeation.

Accordingly, if it is desired to clean the wooden flooring material with a wet mop, the cleaning has to be performed after water has been first removed from the mop. If the wooden flooring material is installed a long time ago, its portion adjacent to the neighboring wooden flooring material may be raised, and the sheet of wood may be rotten. In addition, the wooden flooring material may be flammable so that disadvantageously it is easy to be burnt by fire.

Further, the wooden flooring material may have high contraction and expansion rates, and accordingly, unless spare space is sufficiently ensured, the wooden flooring material may expand larger in summer seasons with a lot of moisture, so that it becomes lifted to cause a defective state.

Unlike the wooden flooring material, improved flooring materials have been recently introduced, while having many advantages, and they include a fiber board and a particle board, which occupy most of current flooring material markets.

For example, a laminate flooring material has been preferred because of a reasonable cost, high stain resistance, easiness in maintenance, high corrosion resistance, high fire resistance, and the like.

As a result, the laminate flooring material removes the disadvantages of natural wood flooring material made of oak and other hard wooden materials, such as deformation after construction, poor rigidity, and so on.

If water continuously permeates the laminate flooring material, however, the surface of the laminate flooring material may be damaged because of low resistance to the water permeated, thereby failing to ensure its long life, and further, the laminate flooring material has bad assembling performance upon construction.

SUMMARY OF THE INVENTION

Accordingly, the present invention has been made in view of the above-mentioned problems occurring in the related art, and it is an object of the present invention to provide a flooring material using pozzolan and a manufacturing method thereof that are capable of making use of an SPC, while being constructed by means of a non-adhesion click-lock structure, so that the flooring material does not generate any harmful substances, has rare contraction and expansion to provide high durability, is possible to be cleaned with steam to allow its care to be easy, and especially installed on places such as kitchens, living rooms, and other places where eco-friendly construction is needed to provide impact resistance, flame retardancy, waterproofing, and sound absorption.

To accomplish the above-mentioned objects, according to one aspect of the present invention, there is provided a flooring material including: a base material layer as a stone plastic composite (SPC) core; a color film layer formed on top of the base material layer to provide a given color and pattern; a wear layer formed on top of the color film layer to provide a corrosion resistance; a UV resistant layer formed on top of the wear layer to provide surface protection; and a pad layer formed on the underside of the base material layer to provide shock absorption and sound absorption, wherein the base material layer is made by molding, to the shape of a sheet, a base material layer composite comprising 20 to 26% by weight of PVC powder, 8 to 12% by weight of pozzolan powder, 1.5 to 2.5% by weight of zinc stearate, 1.5 to 2.5% by weight of ethylene resin, 0.5 to 1.5% by weight of methyl methacrylate, 0.4 to 0.6% by weight of a PVC lubricant, and the remaining percentage by weight of calcium carbonate.

According to the present invention, desirably, the base material layer has a tongue portion formed on one side surface thereof and a groove portion formed on the other side surface thereof, so that the neighboring base material layers are fittedly put together under a click-lock structure.

According to the present invention, desirably, the base material layer, the color film layer, the wear layer, and the UV resistant layer are subjected to treatments by means of a high-pressure press and a hot press sequentially so that the base material layer, the color film layer, the wear layer, and the UV resistant layer are laminated integrally with one another.

According to the present invention, desirably, the pad layer is formed by mixing 10 parts by weight of azodicarbonamide, 5 parts by weight of zinc stearate, and 10 parts by weight of carbon black with respect to 100 parts by weight of polyethylene resin.

To accomplish the above-mentioned objects, according to another aspect of the present invention, there is provided a method for manufacturing a flooring material, including: a first step of mixing raw materials constituting each layer of the flooring material; a second step of extruding the mixed materials to make the sheet constituting the base material layer and the films constituting the color film layer, the wear layer, and the UV resistant layer; a third step of printing a given color and pattern on the color film layer; a fourth step of placing the films constituting the color film layer, the wear layer, and the UV resistant layer sequentially on top of the sheet constituting the base material layer and laminating the films on top of the sheet as the base material layer by means of a high-pressure press; if the lamination is completed, a fifth step of allowing the pressed laminated product to be subjected to a treatment by means of a hot press to enhance hot lamination; and a sixth step of allowing the laminated product to be subjected to cooling to form a tongue portion and a groove portion formed on both sides thereof so as to provide a click-lock structure and attaching the pad layer to the underside of the base material layer to provide a flooring material product.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 3 to 9 show inspection certificates for the properties of the flooring material according to the present invention.

DETAILED DESCRIPTION OF THE PREFERRED EMBODIMENTS

Hereinafter, an embodiment of the present invention will be explained in detail with reference to the attached drawings.

Before the present invention is disclosed and described, specific structural and functional details disclosed herein are suggested just to explain the embodiment of the present invention, and it is to be therefore understood that the disclosed embodiments are merely exemplary of the invention, which can be embodied in various forms.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Figure 1:
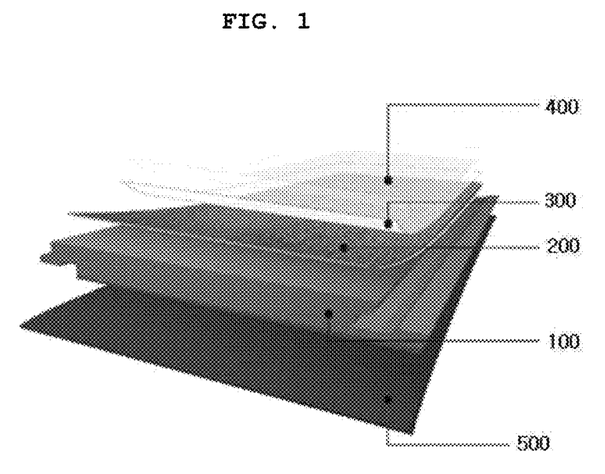
FIG. 1 is a perspective view showing layers constituting a flooring material according to the present invention.
Figure 2:
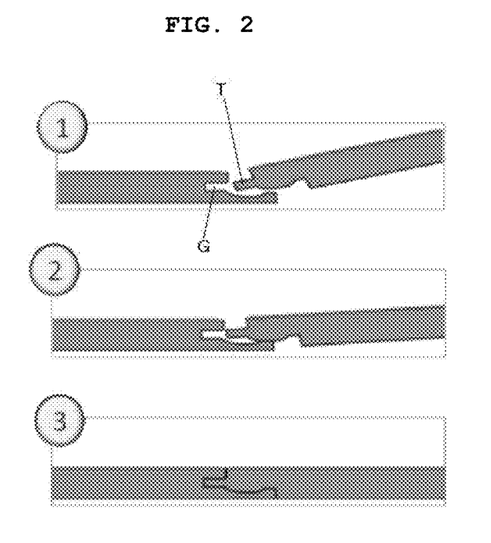
FIG. 2 is a sectional view showing an example where neighboring flooring materials according to the present invention are put together.
Figure 5:
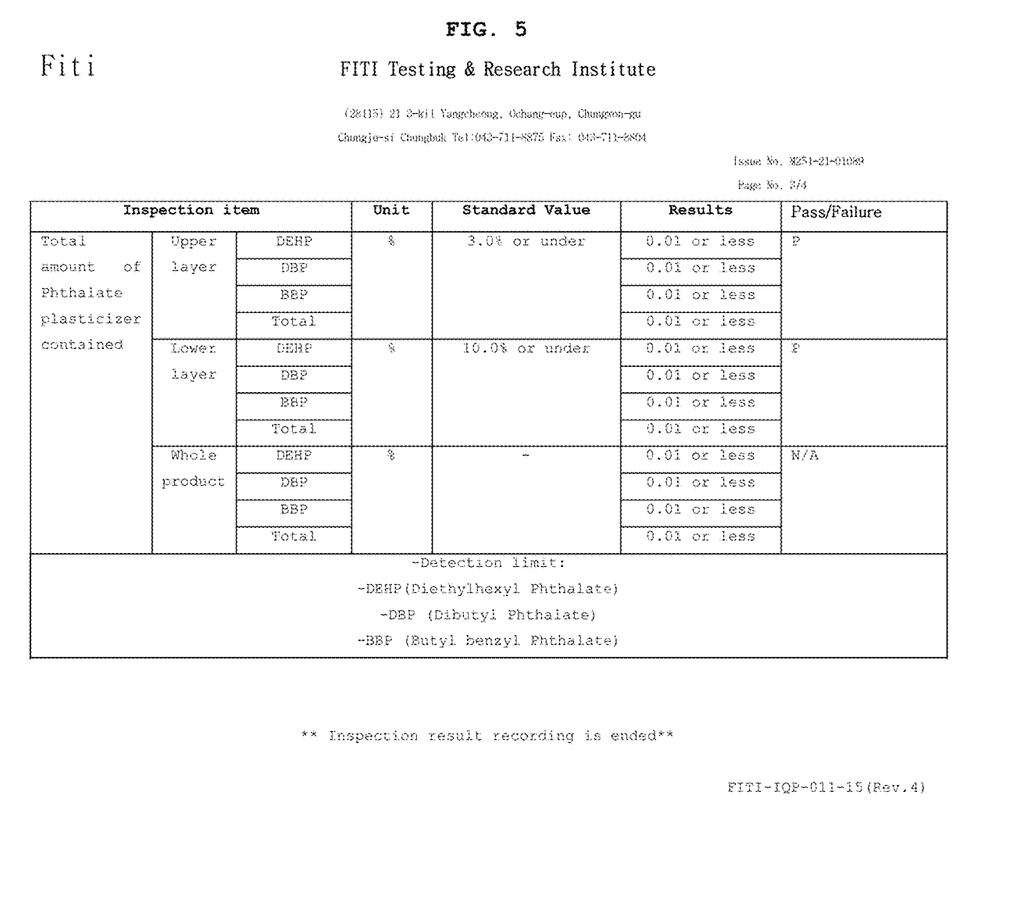

As shown in FIGS. 1 and 2, a flooring material according to the present invention includes a base material layer 100 as a core thereof.

The base material layer 100 includes calcium carbonate and Virgin polyvinyl chloride (PVC) so that it becomes rigid at high density.

Accordingly, the base material layer 100 is safely available as eco-friendly materials having no formaldehyde and VOCs emission and has a fire retardant property.

For example, the base material layer 100 is made by molding a base material layer composite being comprising 20 to 26% by weight of PVC powder, 8 to 12% by weight of pozzolan powder, 1.5 to 2.5% by weight of zinc stearate, 1.5 to 2.5% by weight of ethylene resin, 0.5 to 1.5% by weight of methyl methacrylate, 0.4 to 0.6% by weight of a PVC lubricant, and the remaining percentage by weight of calcium carbonate, thereby obtaining an SPC.

In this case, the PVC powder is made primarily of resin to provide high density and durability, while being eco-friendly, and the zinc stearate is used as a stabilizer that enhances heat resistance of the base material layer 100 and prevents transparent discoloration from occurring.

Further, the ethylene resin is added to reinforce toughness, the methyl methacrylate to maintain impact resistance, and the PVC lubricant is a lubricant for PVC that is formed of polyethylene wax.

The pozzolan powder plays a very important role in forming the base material layer 100, even with a small amount added, to provide far infrared light and negative ion emission, air purification, mold suppression, water vein wave blocking, oxygen generation promotion, and the like.

This is because pozzolan contains germanium, selenium, vanadium, and all types of minerals, and accordingly, it is known that pozzolan in a mineral phase generates 2,000 resonance actions for one minute to thus emit far infrared light.

According to the present invention, the pozzolan in the mineral phase is pulverized into powder with particle sizes in the range between 10 and 20 μm, and when the pozzolan powder is contained in the base material layer 100, it exerts bacteria and mold suppression, harmful electromagnetic wave shielding, and far infrared light and negative ion emission, thereby increasing its usefulness, while exerting deodorizing, sick house syndrome removal, radon dissolution suppression, neutralization of toxicity of cement, harmful material removal, and heavy metal neutralization, thereby strengthening its benefits for a human body.

Moreover, as shown in FIG. 2, the base material layer 100 has a tongue portion T formed on one side surface thereof and a groove portion G formed on the other side surface thereof, so that the neighboring base material layers 100 can be fittedly put together under a click-lock structure.

As a result, a work for putting the neighboring base material layers 100 together is done conveniently and efficiently at a fast speed.

According to the present invention, so as to strengthen the properties of the base material layer 100, the base material layer 100 is formed of a resin composite comprising 15 parts by weight of cashew kernel oil, 15 parts by weight of silica-zirconia composite powder with nano particle sizes, 10 parts by weight of tris 2-chloropropyl phosphate (TCPP), 10 parts by weight of polyvinyl butyral, and 10 parts by weight of hydroxyproline with respect to 100 parts by weight of the base material layer composite.

In this case, the cashew kernel oil is an extract liquid of peels of Indian cashew apples and contains a large amount of cardol and anacardic acids to improve a shock absorbing effect, impact resistance, and tensile strength, thereby strengthening the durability of the base material layer 100.

The silica-zirconia composite powder utilizes porous silica and surface active properties of zirconia to enhance shock absorbing, sound absorbing, waterproofing, and cohesion among the components, thereby suppressing occurrence of cracks and providing a rigid coupled state.

Further, the TCPP is added to reinforce heat resistance and lower a fatigue, thereby ensuring a long life of the base material layer 100, while causing no cracks or breakages.

The polyvinyl butyral is added to ensure chemical resistance and flexibility, thereby maintaining stabilization of the molded member, suppressing oxidization, and increasing an anti-fouling function and waterproofing.

Further, the hydroxyproline is added to increase flexural strength, thereby having functions of crack suppression, splitting prevention, corrosion resistance, contamination prevention, and discoloration suppression.

The above-mentioned components are combinedly added to the base material layer composite, thereby more strengthening the durability, waterproofing, and shock absorbing effect of the base material layer 100.

Further, a color film layer 200 is formed on top of the base material layer 100.

The color film layer 200 expresses different colors and provides various patterns to emphasize its design characteristics.

In this case, the color film layer 200 is desirably formed by applying colors and patterns designed to a PVC film so as to enhance a merging capability with the base material layer 100.

Further, a wear layer 300 is formed on top of the color film layer 200.

The wear layer 300 is a corrosion resistant layer and has the shape of a film having a thickness in the range of 0.4 and 0.6 mm.

The wear layer 300 is made of PVC and laminated on top of the color film layer 200 by means of a high-pressure press so as to enhance a merging capability with the color film layer 200.

To strengthen the characteristics of the wear layer 300, according to the present invention, the wear layer 300 is formed by adding 5 parts by weight of a boric acid, 5 parts by weight of antimony oxide, 2.5 parts by weight of dolomite powder with particle sizes of 10 μm, and 5 parts by weight of ethyl pro-2-enoate with respect to 100 parts by weight of the PVC.

In this case, the boric acid and the antimony oxide are added to reinforce flame resistance and increase fire retardant properties, the dolomite powder to strengthen corrosion resistance, and the ethyl pro-2-enoate to strengthen vulcanization acceleration and binding characteristics of components and to enhance cohesion to thus induce a firm bonding state.

Further, a UV resistant layer 400 is formed on top of the wear layer 300.

The UV resistant layer 400 has moisture absorption and strong resistance to UV light, thereby preventing discoloration, and has scratch resistance, thereby providing surface protection.

To do this, the UV resistant layer 400 has the shape of a film made of polyurethane acrylate as a primary component thereof and is thus laminated on top of the wear layer 300 by means of the high-pressure press.

To strengthen the functions such as surface protection of the UV resistant layer 400, in specific, the UV resistant layer 400 is formed by adding 2.5 parts by weight of PVC resin, 5 parts by weight of borosilicate glass, and 5 parts by weight of polyamide amine with respect to 100 parts by weight of the polyurethane acrylate.

In this case, the PVC resin is added to improve the merging capability with the wear layer 300, the borosilicate glass to strength the surface protection because it has excellent heat resistance, impact resistance, and chemical durability, and the polyamide amine to reinforce heat resistance and cold tolerance and thus to suppress surface scaling from occurring.

Further, a pad layer 500 is formed on the underside of the base material layer 100.

The pad layer 500 serves to perform sound absorption and shock absorption and is formed by mixing 10 parts by weight of azodicarbonamide, 5 parts by weight of zinc stearate, and 10 parts by weight of carbon black with respect to 100 parts by weight of polyethylene resin.

In this case, the azodicarbonamide is used to increase elastic energy absorption and shock absorption, the zinc stearate is used as a stabilizer, and the carbon black is added to exert heat resistance, temperature insulation, and moisture absorption.

The flooring material with the above-mentioned layers according to the present invention is made by the following steps.

First, a first step of mixing raw materials constituting each layer is carried out.

At the first step, the raw materials are mixed and uniformly distributed.

Next, a second step of extruding the mixed materials is carried out to make a sheet constituting the base material layer and films constituting the color film layer, the wear layer, and the UV resistant layer, respectively.

After that, a third step of printing a given color and pattern on the color film layer is carried out.

Next, a fourth step of placing the films constituting the color film layer, the wear layer, and the UV resistant layer sequentially on top of the sheet constituting the base material layer is carried out to laminate the films on top of the sheet as the base material layer by means of a high-pressure press.

If the lamination is completed, a fifth step of allowing the pressed laminated product to be subjected to a treatment by means of a hot press is carried out to enhance hot lamination.

After the fifth step, layer separation may not occur well owing to the merging capability of the PVC, thereby providing a rigid laminated product.

Next, a sixth step of allowing the laminated product to be subjected to cooling to form a tongue portion and a groove portion formed on both sides thereof to provide a click-lock structure and attaching the pad layer to the underside of the base material layer to provide a flooring material product is carried out.

Through the above-mentioned steps, the flooring material is eco-friendly, convenient in construction, and increased in the benefits to the human body.

To check the properties and harmfulness of the flooring material manufactured by the above-mentioned steps, tests are performed by accredited testing laboratories, and the test results are described in the attached drawings.

First, it is checked whether the flooring material of the present invention satisfies the basic properties as the flooring material under the tests performed by FITI Testing & Research Institute, and the test results represent that the flooring material of the present invention satisfies the basic properties, as shown in FIGS. 3 to 6.

Figure 7:
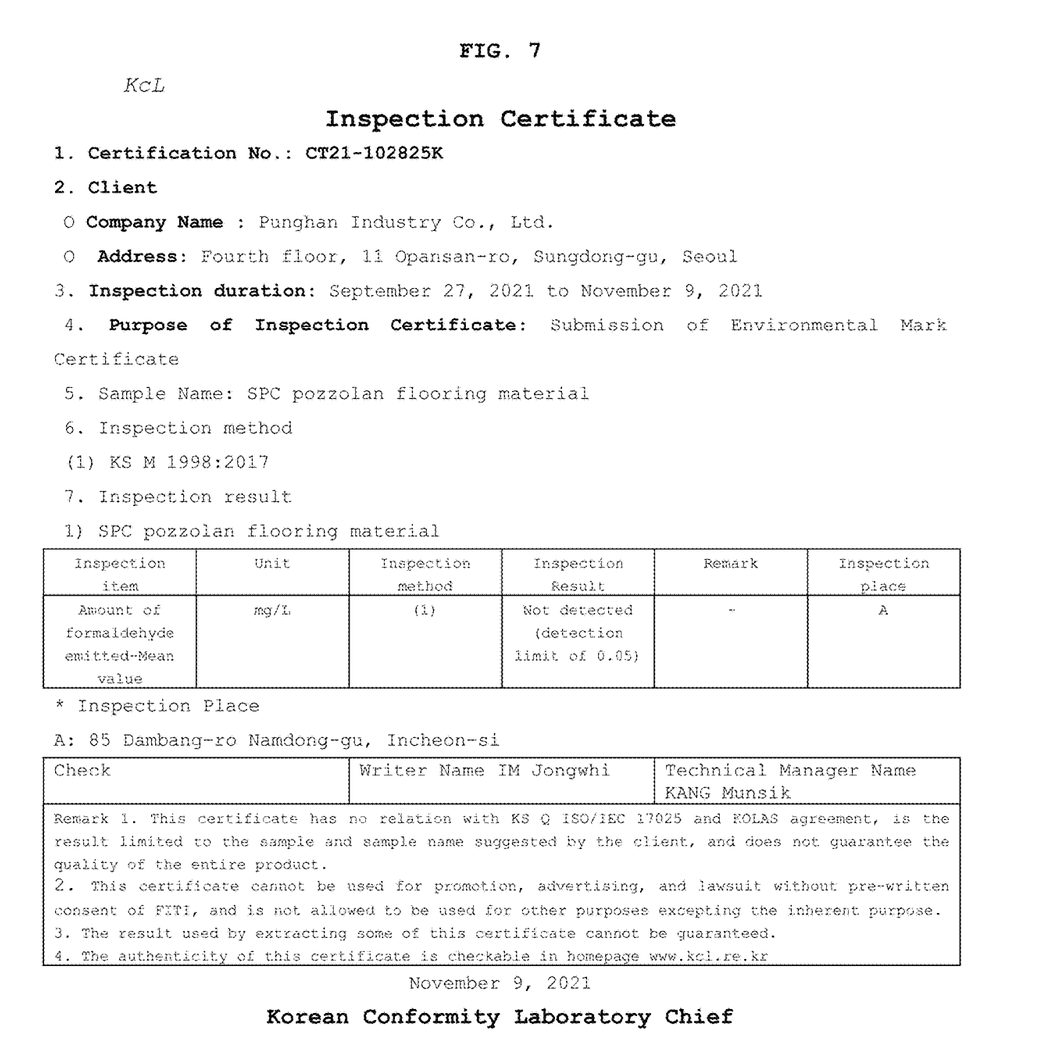

Further, it is checked whether formaldehyde is emitted from the flooring material of the present invention under the tests performed by Korean Conformity Laboratories, and the test results represent that no formaldehyde is emitted from the flooring material of the present invention, as shown in FIG. 7, so that the flooring material of the present invention is not harmful to the human body.

Figure 8:
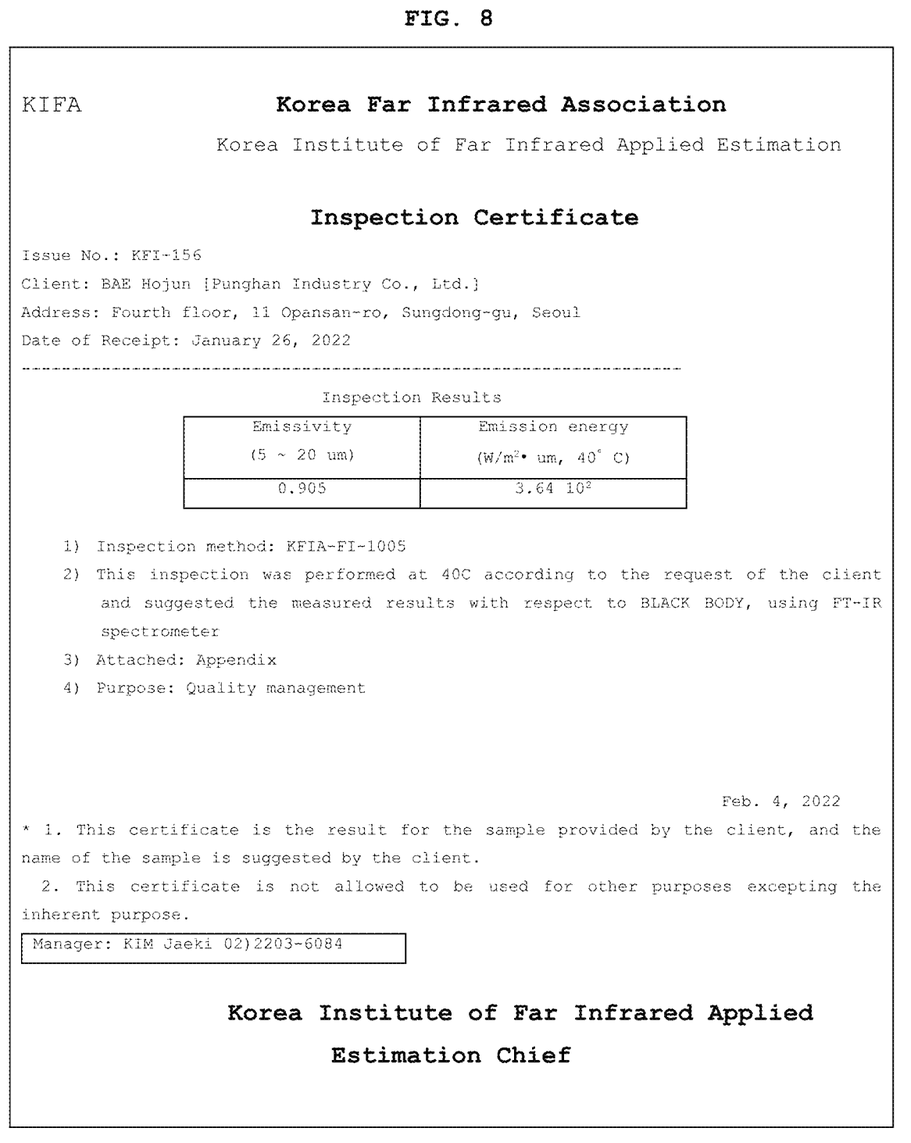

In addition, it is checked whether far-infrared light is emitted from the flooring material of the present invention under the tests performed by Korean Institute of Far Infrared Applied Estimation, and the test results represent that the flooring material of the present invention has excellent far-infrared emission characteristics, as shown in FIG. 8.

Moreover, it is checked whether radon above a normal value is emitted from the flooring material of the present invention under the tests performed by Korean Conformity Laboratories, and the test results are good, as shown in FIG. 9.

Accordingly, it can be appreciated that the flooring material of the present invention is eco-friendly, beneficial to the human body, and not harmful to the human body.

As described above, the flooring material according to the present invention includes the SPC and is constructed by means of the non-adhesion click-lock structure, so that the flooring material does not generate any harmful substances, has rare contraction and expansion to provide high durability, is possible to be cleaned with steam to allow its care to be easy, and especially installed on places such as kitchens, living rooms, and other places where eco-friendly construction is needed to provide impact resistance, flame retardancy, waterproofing, and sound absorption.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A flooring material comprising:
    a base material layer as a stone plastic composite (SPC) core;
    a color film layer formed on top of the base material layer to provide a given color and pattern;
    a wear layer formed on top of the color film layer to provide corrosion resistance;
    a UV resistant layer formed on top of the wear layer to provide surface protection; and
    a pad layer formed on the underside of the base material layer to provide shock absorption and sound absorption,
    wherein the base material layer is made by molding, to the shape of a sheet, a base material layer composite comprising 20 to 26% by weight of PVC powder, 8 to 12% by weight of pozzolan powder, 1.5 to 2.5% by weight of zinc stearate, 1.5 to 2.5% by weight of ethylene resin, 0.5 to 1.5% by weight of methyl methacrylate, 0.4 to 0.6% by weight of a PVC lubricant, and the remaining percentage by weight of calcium carbonate.

2. The flooring material according to claim 1, wherein the base material layer has a tongue portion T formed on one side surface thereof and a groove portion G formed on the other side surface thereof, so that neighboring base material layers can be fittedly put together under a click-lock structure.

3. The flooring material according to claim 1, wherein the base material layer, the color film layer, the wear layer, and the UV resistant layer are subjected to treatments by means of a high-pressure press and a hot press sequentially so that the base material layer, the color film layer, the wear layer, and the UV resistant layer are laminated integrally with one another.

4. The flooring material according to claim 1, wherein the pad layer is formed by mixing 10 parts by weight of azodicarbonamide, 5 parts by weight of zinc stearate, and 10 parts by weight of carbon black with respect to 100 parts by weight of polyethylene resin.

5. A method for manufacturing the flooring material of claim 1, comprising:
    a first step of mixing the raw materials constituting each layer as defined in claim 1;
    a second step of extruding the mixed materials to make a sheet constituting the base material layer and the films constituting the color film layer, the wear layer, and the UV resistant layer;
    a third step of printing a given color and pattern on the color film layer;
    a fourth step of placing the films constituting the color film layer, the wear layer, and the UV resistant layer sequentially on top of the sheet constituting the base material layer and laminating the films on top of the sheet constituting the base material layer by means of a high-pressure press;
    a fifth step of allowing the pressed laminated product to be subjected to a treatment by means of a hot press to enhance hot lamination; and
    a sixth step of allowing the laminated product to be subjected to cooling to form a tongue portion and a groove portion formed on both sides thereof so as to provide a click-lock structure and attaching the pad layer to the underside of the base material layer to provide the flooring material.

* * * * *